P. C. SCHROEDER.
CORNER JOINT FOR BOXES, &c.
APPLICATION FILED DEC. 21, 1916.
1,322,203.
Patented Nov. 18, 1919.
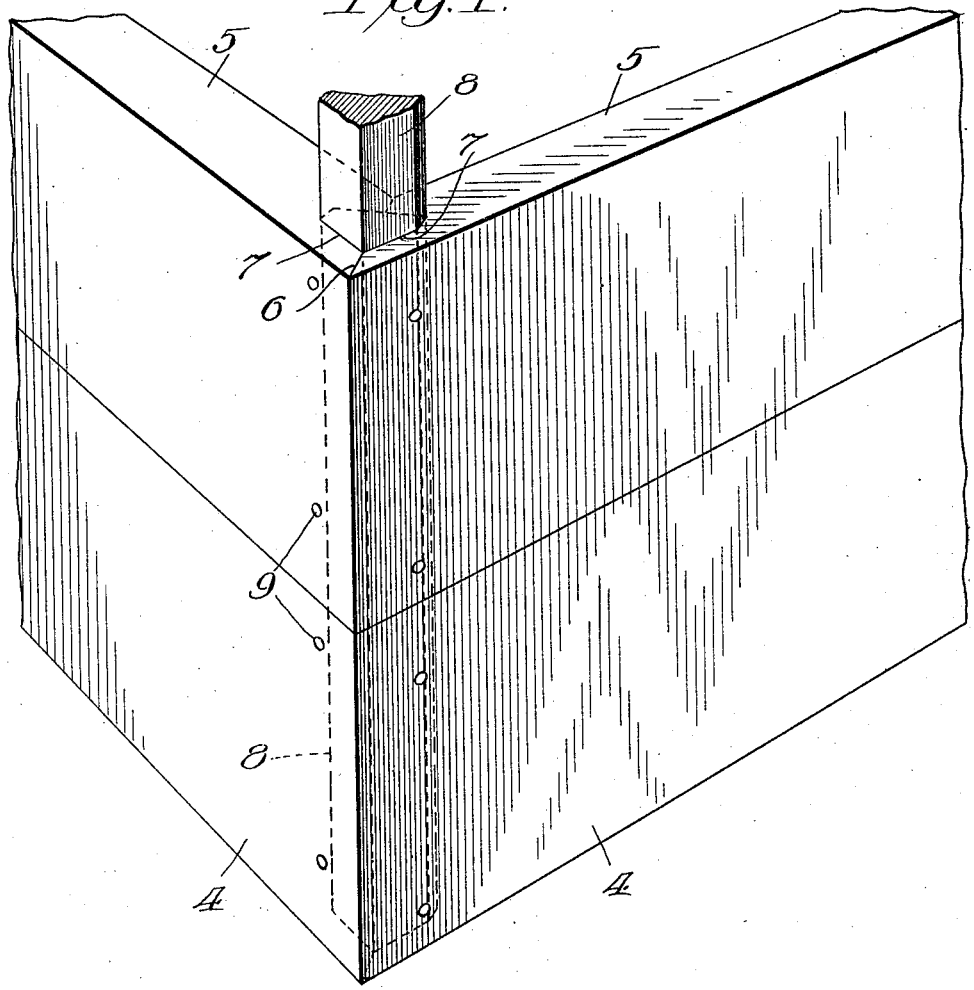
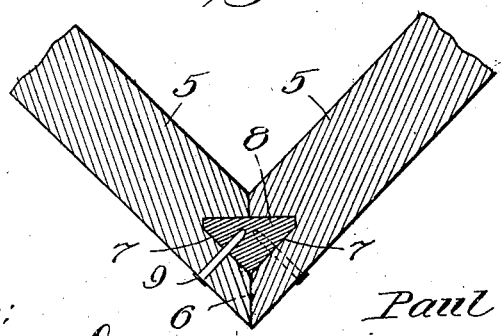
Witness:
Harry S. Gaither
Inventor:
Paul C. Schroeder
By Miller Chindahl Parker
Attys

UNITED STATES PATENT OFFICE.

PAUL C. SCHROEDER, OF CHICAGO, ILLINOIS, ASSIGNOR TO SEARS, ROEBUCK AND COMPANY, OF CHICAGO, ILLINOIS, A CORPORATION OF NEW YORK.

CORNER-JOINT FOR BOXES, &c.

1,322,203.   Specification of Letters Patent.   Patented Nov. 18, 1919.

Application filed December 21, 1916. Serial No. 138,157.

*To all whom it may concern:*

Be it known that I, PAUL C. SHROEDER, a citizen of the United States, residing at Chicago, in the county of Cook and State of Illinois, have invented certain new and useful Improvements in Corner-Joints for Boxes, &c., of which the following is a specification.

This invention relates to an improved corner joint for boxes, cases, trunks, chests, cabinets and other wooden receptacles of all kinds, and the object of the invention is to provide an improved joint which is simple, strong and inexpensive to make.

In the accompanying drawings, Figure 1 is a perspective view of one corner of a box or other receptacle illustrating a joint embodying the features of my invention. Fig. 2 is a sectional view of the joint.

The box may comprise one or any desired number of tiers of boards, two tiers 4 and 5 being illustrated in the drawing by way of example. The ends of the boards are mitered or beveled as at 6 to abut against each other, and in each end is formed a groove 7 which is preferably V-shaped, the groove running in the plane of the wall and being located approximately midway between the side faces of said wall. Preferably the grooved and beveled end of each wall is exactly like that of any other wall so that any two ends may fit together, and a further advantage of this duplicate shaping is that every end may be formed by the same tool or machine in exactly the same way.

When the two beveled ends of the walls are fitted together, the two grooves 7 form a triangular hole, the grooves preferably being shaped so that the base of the triangle extends transversely or perpendicularly to the beveled faces 6 and so that the apex of the triangle lies in the plane of said faces 6. The triangular hole is completely surrounded by the material of the walls.

A triangular locking key or reinforcing strip 8 is shaped to fit snugly in the hole 7 and if there are more than one tier of boards 4, 5, as shown in Fig. 1, the strip 8 is made of suitable length to pass through all of the tiers so that the strip serves not only as a reinforcement for the abutting ends of each pair of boards but serves also to rigidly tie the entire number of tiers together. The corners of the strip may be flattened and the grooves 7 similarly shaped if desired.

The walls and strip may be secured in place in any desired way, either by adhesive such as glue or by fastening devices such as brads or screws or both. In the drawing, I have indicated by way of example brads 9 which enter the walls and the strip 8 for fixing the parts together.

By reason of its shape and location, the strip 8 strongly resists any relative movement in any direction whatsoever between the joined walls. The structure disclosed provides an extremely simple, strong and durable joint for wooden receptacles and one which is at the same time quite inexpensive to manufacture.

I claim as my invention:

A box or the like comprising a plurality of walls of substantial thickness having abutting edges, each edge being mitered and provided substantially midway between its side faces with a groove, a key triangular in shape entered into the grooves of any two abutting edges, and fastening devices entered into the walls and keys from the exterior of the box, and in directions substantially at right angles to each other, the abutting edge and groove of one wall being made exactly similar to the edge and groove of its adjoining wall and being so arranged that the key entered therein has two faces disposed substantially parallel to the outer side faces of such walls and one face at right angles to the joint, whereby the fastening devices may be driven straight into the walls and into the key substantially centrally thereof to obtain a firm hold therein.

In testimony whereof I have hereunto set my hand.

PAUL C. SCHROEDER.